United States Patent
Scholtes et al.

(10) Patent No.: US 10,273,967 B2
(45) Date of Patent: Apr. 30, 2019

(54) COMPRESSOR SHROUD COMPRISING A SEALING ELEMENT PROVIDED WITH A STRUCTURE FOR ENTRAINING AND DIVERTING DISCHARGE AIR

(71) Applicant: SANFRAN AIRCRAFT ENGINES, Paris (FR)

(72) Inventors: Christophe Scholtes, Vaux-le-Penil (FR); Antoine Robert Alain Brunet, Avon (FR); Kevin Eugene Henri Giboudeaux, Saint Germain les Corbeil (FR); Hadrien Paul Alexandre Mage, Combs la Ville (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 330 days.

(21) Appl. No.: 15/104,894

(22) PCT Filed: Dec. 17, 2014

(86) PCT No.: PCT/FR2014/053398
§ 371 (c)(1),
(2) Date: Jun. 15, 2016

(87) PCT Pub. No.: WO2015/092281
PCT Pub. Date: Jun. 25, 2015

(65) Prior Publication Data
US 2018/0163740 A1   Jun. 14, 2018

(30) Foreign Application Priority Data

Dec. 19, 2013   (FR) ..................................... 13 63077

(51) Int. Cl.
*F04D 29/08*   (2006.01)
*F04D 29/54*   (2006.01)
(Continued)

(52) U.S. Cl.
CPC .......... *F04D 29/083* (2013.01); *F01D 11/001* (2013.01); *F02C 3/04* (2013.01);
(Continued)

(58) Field of Classification Search
CPC .... F04D 29/542; F04D 29/083; F04D 29/563; F05D 2240/11; F01D 11/12; F01D 11/127; F01D 11/001; F02C 3/04; F02C 7/28
(Continued)

(56) References Cited

U.S. PATENT DOCUMENTS 5,211,533 A * 5/1993 Walker ................. F01D 11/001
                                                415/115
7,540,709 B1   6/2009 Ebert
(Continued)

OTHER PUBLICATIONS

International Search Report dated Apr. 29, 2015, in PCT/FR2014/053398 filed Dec. 17, 2014.
(Continued)

*Primary Examiner* — Jason Shanske
*Assistant Examiner* — Maxime Adjagbe
(74) *Attorney, Agent, or Firm* — Oblon, McClelland, Maier & Neustadt, L.L.P.

(57) ABSTRACT

A compressor shroud for an aircraft turbine engine, the shroud being arranged between two bladed rotary wheels and radially in line with a deflector, the shroud including a sealing device including one or more sealing elements, including a downstream end sealing element on which, projecting downstream, an air entraining and diverting structure is provided, designed to axially divert the discharge air issuing from the end sealing element.

10 Claims, 4 Drawing Sheets

(51) Int. Cl.
*F04D 29/56* (2006.01)
*F01D 11/00* (2006.01)
*F02C 3/04* (2006.01)
*F02C 7/28* (2006.01)

(52) U.S. Cl.
CPC .............. *F02C 7/28* (2013.01); *F04D 29/542* (2013.01); *F04D 29/563* (2013.01); *F05D 2220/323* (2013.01); *F05D 2240/11* (2013.01); *F05D 2240/24* (2013.01); *F05D 2240/55* (2013.01)

(58) Field of Classification Search
USPC .......................................... 415/173.5, 174.5
See application file for complete search history.

(56) References Cited

U.S. PATENT DOCUMENTS

| | | |
|---|---|---|
| 7,708,520 B2 * | 5/2010 | Paolillo ................. F01D 11/001 415/174.5 |
| 2009/0129916 A1 | 5/2009 | Young et al. |
| 2011/0058933 A1 | 3/2011 | Gomez |
| 2012/0034072 A1 | 2/2012 | Bagnall et al. |

OTHER PUBLICATIONS

French Search Report dated Sep. 19, 2014, in French Application 1363077 filed Dec. 19, 2013.
U.S. Appl. No. 14/478,120, filed Sep. 5, 2014, Damien Joseph Cellier et al., Mar. 2015.

* cited by examiner

COMPRESSOR SHROUD COMPRISING A SEALING ELEMENT PROVIDED WITH A STRUCTURE FOR ENTRAINING AND DIVERTING DISCHARGE AIR

TECHNICAL FIELD

The invention relates to the field of aircraft turbine-engine compressors. It relates more particularly to controlling the temperature of sensitive parts of the compressors, and more specifically parts of the high-pressure compressor.

The invention applies to any type of turbine engine, in particular to turbojet engines and turboprop engines.

PRIOR ART

A high-pressure compressor of an aircraft turbine engine comprises, in alternation in the axial direction, bladed rotary wheels and deflectors. Conventionally, the rotor of the compressor has a shroud connecting two successive bladed rotary wheels. This shroud is situated radially in line with the deflector arranged between the two wheels, and has sealing elements cooperating with an abradable cladding installed on the deflector. The sealing elements and the abradable cladding form together a so-called labyrinth seal, significantly reducing the recirculation of air in the compressor, this recirculation naturally being detrimental to the overall performance of the turbine engine.

To reduce this recirculation, it is necessary to create a small clearance between the stator part and the rotor part. Nevertheless, even if a very small clearance improves the performance and operability of the engine, the integrity of the sealing elements is often imperilled because of possible contact thereof with the abradable cladding, in operation. To reduce this risk, it is necessary to increase the clearance between the stator part and the rotor part, but this reduces the performance and increases the risks of surging in the compressor.

Whatever the case, the presence has been noted of a hot spot on the shroud, downstream of the group of sealing elements, in the direction of flow of the discharge air through these same sealing elements. The presence of such a hot spot is problematic firstly because it may create accelerated degradation of this part of the shroud subjected to a very high temperature, and secondly because it is liable to give rise to a thermal gradient causing high mechanical stresses. In both cases, it is the mechanical strength of the shroud that is affected.

DISCLOSURE OF THE INVENTION

The aim of the invention is therefore to at partially remedy the problems mentioned above, encountered in the solutions of the prior art.

To do this, the subject matter of the invention is a compressor shroud for an aircraft turbine engine, the shroud being intended to be arranged between two bladed rotary wheels and radially in line with a deflector situated between the two rotary wheels of the compressor, the shroud comprising a sealing device comprising one or more sealing elements projecting radially towards the outside in the direction of said deflector, said sealing device comprising, at its downstream end in the direction of flow of the discharge air through this sealing device, an end sealing element.

According to the invention, said shroud also comprises, projecting downstream from said end sealing element, a structure for entraining and diverting air designed to axially divert the discharge air issuing from the end sealing element.

Thus the invention cleverly makes provision for conditioning the discharge air at the discharge from the sealing device, in order to reduce/eliminate the hot spot observed on the shroud, downstream of the end sealing element. This is because studies have demonstrated that, in the conventional solutions of the prior art, the hot spot observed is essentially due to a low circumferential speed of the flow of discharge air issuing from the end sealing element, as well as to the direction of this flow of discharge air having a very high radial component.

In the invention, the discharge air issuing from the end sealing element comes into contact with the entraining and diverting structure, which makes it possible to benefit from the following advantages. First of all, the discharge air is diverted so as to be diffused axially, which prevents it from directly impacting the shroud in a confined zone in which the hot spot was previously found. This diffusion makes it possible to change the flow of the discharge air and promotes contact of the latter with a larger surface area of the shroud and of its surrounding rotating elements. The increase in the contact surface reduces the coefficients of exchange and limits the risks of appearance of a hot spot on the shroud. In this regard, it should be noted that the mechanical stresses are very substantial at the temperature level and temperature gradients, in particular in the zones for which cracks have been able to be observed in the prior art. With the invention, it has been found that a reduction in one or more tens of degrees, for example 10° C. to 20° C., increases the service life of these parts by at least 15%.

Furthermore, the structure specific to the invention drives the discharge air that comes into contact with it, and consequently increases the entrainment coefficient. This leads to an increase in the circumferential speed of the air, and therefore also participates in the reduction of the exchange coefficients.

Moreover, it is important to note that the two functions provided by the entraining and diverting structure are convergent since, the more the deflection performed leads to increasing the exchange surface, the more the speed of driving of the discharge air flow will have a tendency to increase.

In summary, the invention makes provision for diverting the flow of discharge air and accelerating it, in order to reduce the exchange coefficients and to limit the risks of appearance of a hot spot on the shroud. The result is better mechanical strength of the latter.

Preferably, said structure for entraining and diverting air takes the form, in a longitudinal half-section, of an arm carried by the end sealing element.

The arm is preferably inclined axially so as to extend radially outwards going towards the downstream end, in the direction of flow of the discharge air.

Preferably, the arm is inclined by an angle of between 20° and 60° with respect to the axial direction.

Preferably, the air entraining and diverting structure is produced in a single piece with the end sealing element.

Preferably, the end sealing element has, from its base, an element height H1, and the air entraining and diverting structure is connected to the end sealing element at a base of the structure the centre of which is situated at a height H2 from the base of the end sealing member, so that the heights H1 and H2 satisfy the following formula: H2>H1/3.

Another subject matter of the invention is a compressor for an aircraft turbine engine, comprising two bladed rotary wheels between which a deflector is placed, the compressor also comprising a shroud as described above, connecting the bladed rotary wheels and situated radially in line with the deflector, the latter comprising an abradable cladding cooperating with each sealing element of the sealing device equipping the shroud.

Preferably, the air entraining and diverting structure has no contact with the abradable cladding.

Preferably, the clearance between the abradable cladding and the end sealing element is less than the minimum distance between the entraining and diverting structure, and the abradable cladding.

Finally, a subject matter of the invention is an aircraft turbine engine comprising such a compressor, which is preferably a high-pressure compressor.

Other advantages and features of the invention will emerge from the following non-limitative detailed description.

BRIEF DESCRIPTION OF THE DRAWINGS

This description will be given with regard to the accompanying drawings, among which.

DETAILED DESCRIPTION OF PREFERRED EMBODIMENTS

Figure 1:
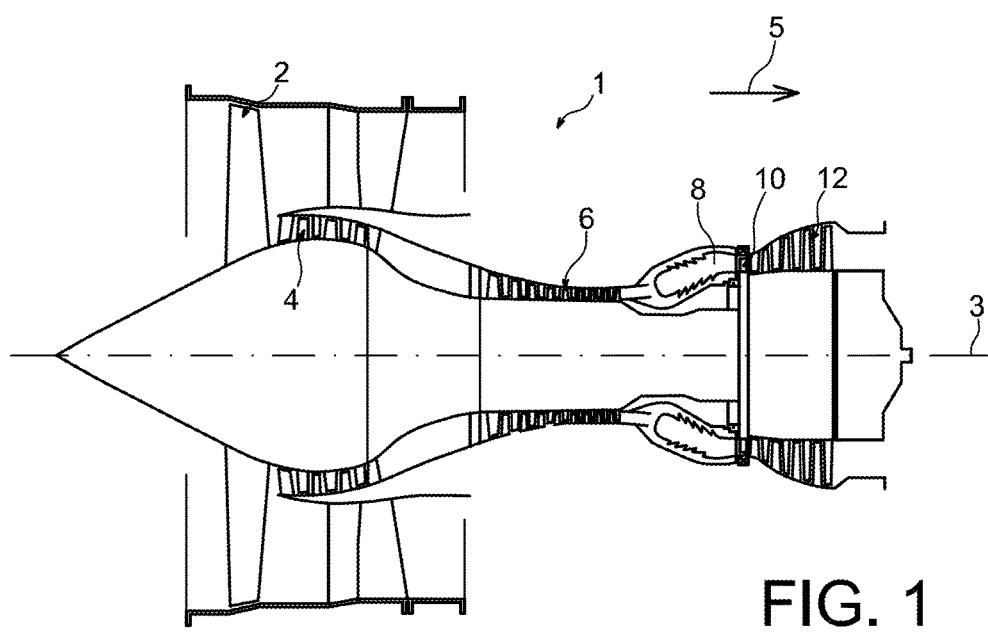
FIG. 1 depicts a schematic view in longitudinal section of a turbine engine, according to a preferred embodiment of the invention.

With reference first of all to FIG. 1, an aircraft turbine engine 1 is shown, according to a preferred embodiment of the invention. It is here a dual-body bypass turbojet engine. Nevertheless, it could be a turbine engine of another type, for example a turboprop engine, without departing from the scope of the invention.

Overall, the turbine engine 1 has a longitudinal axis 3 around which its various components extend. It comprises, from upstream to downstream in a main direction of flow of gases through this turbine engine depicted by the arrow 5, a fan 2, a low-pressure compressor 4, a high-pressure compressor 6, a combustion chamber 8, a high-pressure turbine 10 and a low-pressure turbine 12.

Figure 2:
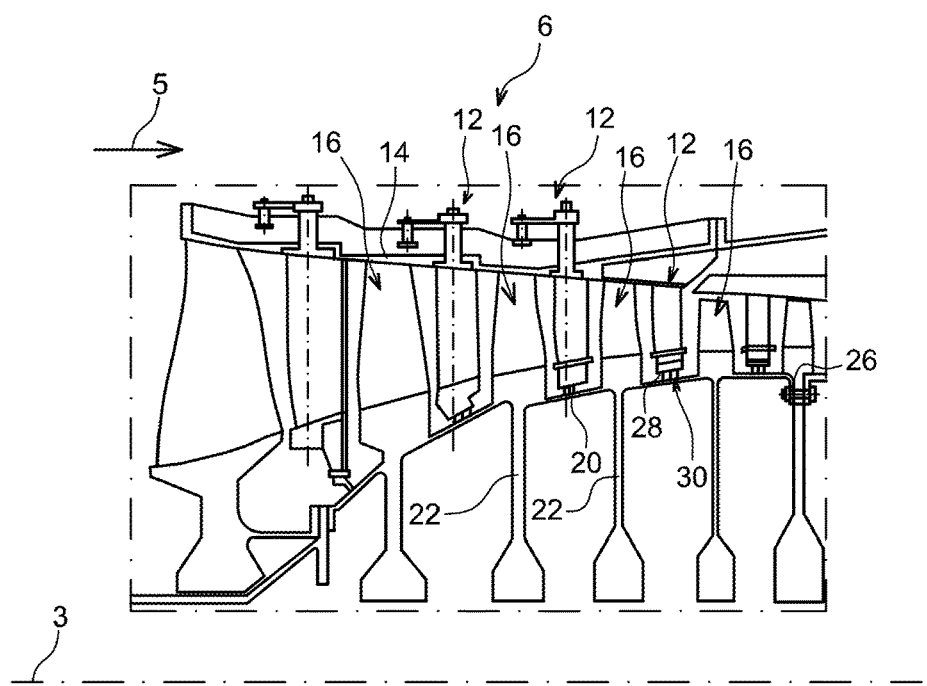
FIG. 2 depicts a view in longitudinal half-section of a part of the high-pressure compressor of the turbine engine shown in the previous figure.
Figure 3:
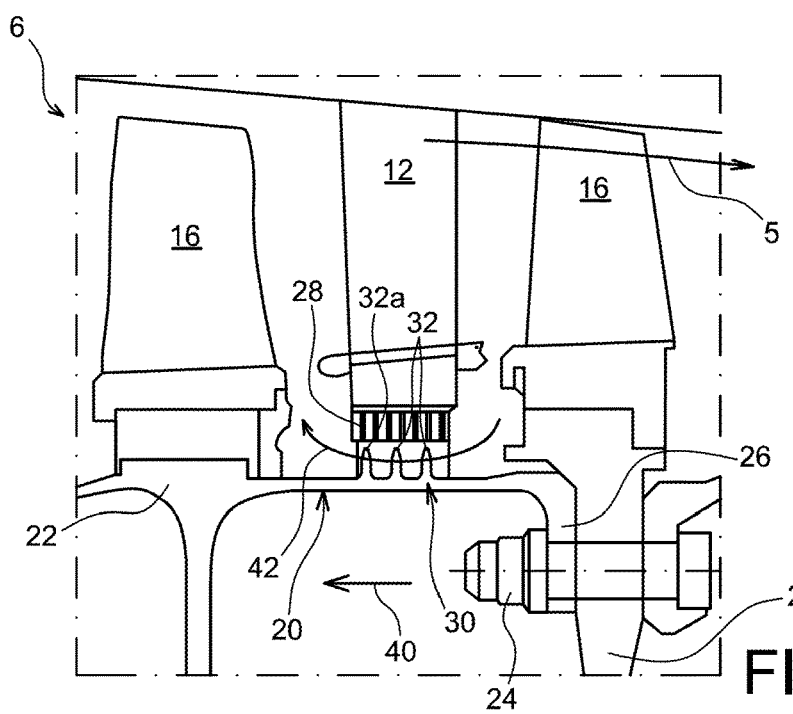
FIG. 3 depicts an enlarged view of a part of the high-pressure compressor of the previous figure.

With reference now to FIGS. 2 and 3, a part of the high-pressure compressor 6 is shown, in which the invention is situated. Nevertheless, the latter is also applicable to the low-pressure compressor 4, without departing from the scope of the invention.

The compressor 6 comprises a plurality of stages each comprising a deflector 12 formed by an annular row of stator blades carried by a casing 14 of the compressor, and a bladed rotary wheel 16 mounted upstream of its associated deflector.

The two wheels 16 of two directly consecutive stages are connected by a shroud 20, for example produced in a single piece with the disc 22 of one of the two wheels 16. The connection with the other wheel 16 is preferably made by bolts 24, which connect the disc 22 of this other wheel 16 to a flange 26 extending the shroud 20.

The deflector 12, situated between the two wheels 16, is arranged radially in line with the shroud 20 that it surrounds. At its internal annular end, the deflector 12 comprises an abradable cladding 28, preferably of the honeycomb type. This cladding cooperates with the sealing device 30 integrated in the shroud. The device 30 is preferably produced in a single piece with the shroud, or may be attached to it. It is equipped with a plurality of sealing elements 32 projecting radially outwards, in the direction of the abradable cladding 28. The sealing elements 32 are spaced apart axially from one another and may be straight as depicted in FIG. 3 or inclined with respect to the radial direction. Together, the elements 28, 32 form a seal of said labyrinth seal, significantly reducing the recirculation of air in the compressor. This recirculation of air corresponds to a discharge air flow 42 passing through the aforementioned seal, the direction of flow of which has been shown schematically by the arrow 40 in FIG. 3. This direction 40 of flow of the discharge air is in the opposite direction to that of the main direction 5 of flow of gases through the turbine engine. In this regard, it should be noted that, in the remainder of the description, the terms "upstream" and "downstream" will be used with reference to the direction 40 of flow of the discharge air, rather than with reference to the main direction 5 in the opposite direction.

Figure 4:
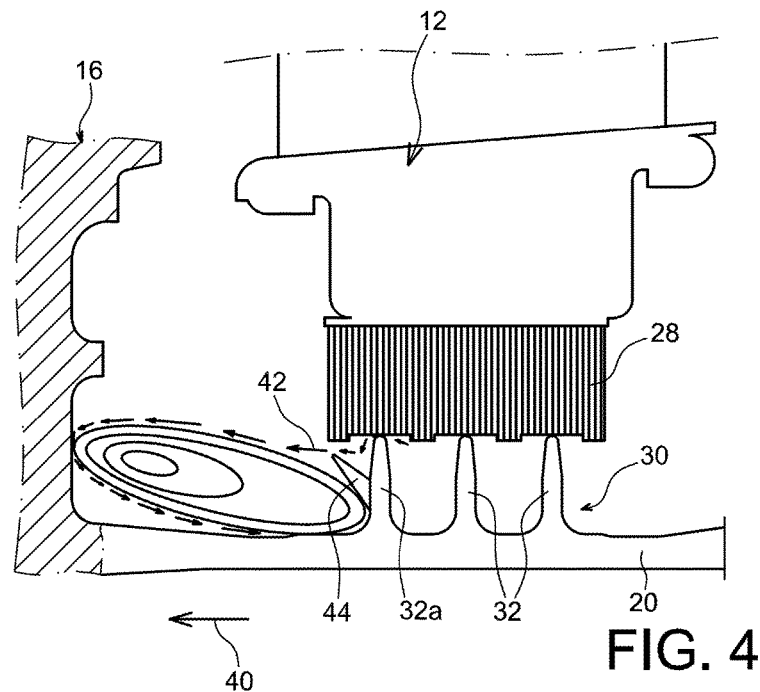
FIG. 4 depicts an even more enlarged view of the compressor, showing in more detail the shroud specific to the invention.

With reference now to FIG. 4, one of the particularities of the invention is shown, consisting of providing a structure 44 for entraining and diverting discharge air, equipping the sealing element 32a situated at the downstream end of the sealing device 30. This end sealing element 32a forms an integral part of the three sealing elements 32 of the device 30, and corresponds to the one situated furthest downstream. It is therefore equipped with a structure 44 in the form of an arm in the half cross-section of FIG. 4, this arm projecting downstream from this end sealing element 32a. The arm 44 is designed to be annular and to extend continuously around the axis 5 of the turbojet engine, or designed to consist of elements spaced apart circumferentially from one another, still around this axis 5. Preferably, the arm 44 is produced in a single piece with the end sealing element 32a.

The arrows 42 in FIG. 4 show the discharge air flow through the labyrinth seal 28, 32 and then its flow downstream after it leaves the seal. When it is extracted from the seal by the end sealing element 32a, this discharge air flow has a very high radial component in the direction of the shroud 20. Nevertheless, this shroud is not reached directly since the discharge air flow first of all comes into contact with the arm 44. Thus the discharge air is diverted axially by the arm 44. Axial diversion means that the radial component of the discharge air flow is first of all reduced in favour of its axial component in the downstream direction. Preferably, the arm 44 is inclined so that the discharge air flow that escapes therefrom regains a radial component, but this time oriented radially outwards.

In addition, the discharge air is rotated by its friction with the external surface of the rotating arm 44, which increases the entrainment coefficient.

Figure 5A:
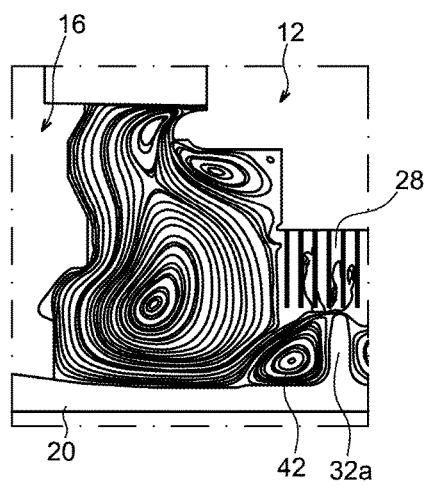
FIGS. 5a and 5b are comparative views showing schematically the flow of the discharge air with the embodiments of the prior art, and with the design according to the invention shown in the previous figures.
Figure 5B:
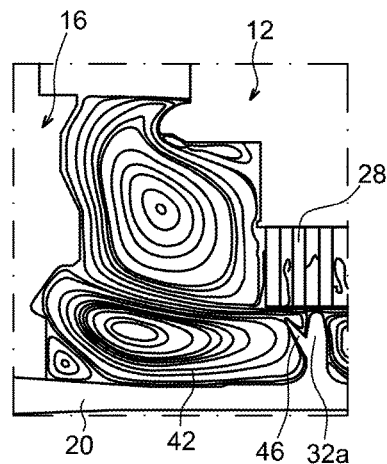

Thus, with its increased speed and its reorientation, the discharge air reaches the surrounding rotating elements situated downstream of the seal, in particular the rotating wheel 16 and the downstream part of the shroud 20. As has been shown schematically in FIG. 4, the discharge air then flows along substantially concentric flow lines, hugging a large surface area of the surrounding elements, namely a very large part of the shroud situated downstream of the seal 28, 32, and part of the downstream wheel 16, close to the blade roots. This can also be seen in FIG. 5b, showing the flow 42 of the discharge air, as has been able to be observed via modelling software. In comparison with FIG. 5a, the flow 42 observed in the prior art is much less extensive, and remains confined close to the end sealing element 32a, on a small axial part of the shroud 20 that is the subject of the aforementioned hot spot.

The greater amplitude of the flow 42 observed with the present invention increases the entrainment coefficient, reduces the exchange coefficients and therefore limits the risks of appearance of a hot spot on the shroud. The result is better mechanical strength of the shroud 20.

Figure 6:
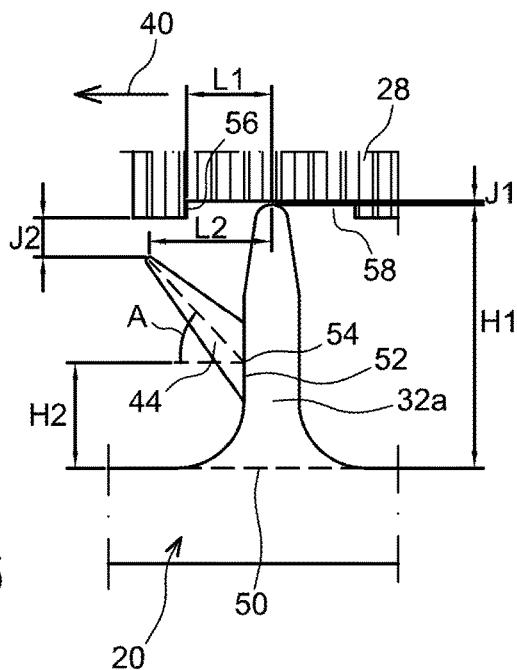
FIG. 6 is an enlarged view of the downstream end sealing element equipping the shroud, and of the structure for entraining and diverting air specific to the invention.

With reference now to FIG. 6, as mentioned previously, it is shown that the arm 44 is inclined with respect to the axial direction so as to extend radially outwards in the downstream direction. This makes it possible to impose on the discharge air emerging from the arm 44 a radial component oriented outwards, in contradistinction to its radial component towards the inside observed at its discharge from the end sealing element 32a. The angle of inclination A between the arm 44 and the axial direction is for example between 20 and 60.

In FIG. 6, other preferential geometric parameters have been shown.

Figure 7:
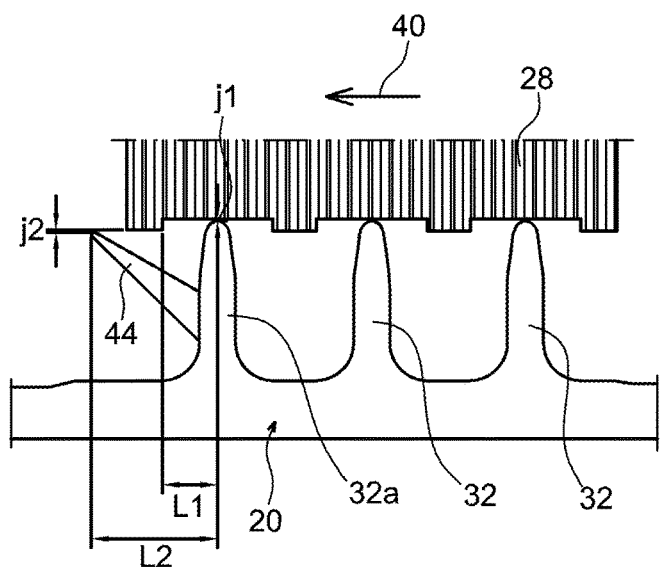
FIG. 7 is a view similar to that in FIG. 4, showing an alternative embodiment.

It is a case first of all of the clearance J1 between the abradable cladding 28 and the end of the end sealing element 32a. This clearance J1 is less than the clearance J2 between the cladding 28 and the end of the arm 44 radially facing this same cladding. The ratio between these clearances is preferably high, for example greater than five. In the alternative embodiment shown in FIG. 7, the arm 44 extends axially downstream beyond the abradable cladding 28, for a gain in efficacy by an increase in the air entrainment surface. Nevertheless, here also, the minimum distance J2 between this arm 44 and the cladding 28 remains greater than the clearance J1, preferably in the same proportions as those mentioned above. Consequently the arm 44 has no contact with the abradable cladding 28, even in operation.

Returning to FIG. 6, it is shown that the downstream end sealing element 32a has, from its base 50 situated in line with the external surface of the shroud 20, a sealing-element height H1. In addition, the arm 44 is connected to the sealing element 32a at a base 52, the centre 54 of which is situated at a height H2 from the base 50 of the end sealing element 32a. To limit the risks of formation of a recirculation pocket between the arm 44 and the top part of the end sealing element 32a, in which the discharge air would risk heating up, it is preferably ensured that the height H2 is greater than one third of the height H1.

Finally, still for a maximum gain in efficacy, it is ensured that the axial distance L2 between the distal end of the arm 44 and the centre of the end sealing element 32a is much greater than the axial distance L1 between this same centre and the axial wall 56 of the cladding 28, defining the cavity 58 in which the end of the sealing element 32a is situated. This is because the downstream part of the abradable substance has a tendency to rotationally restrict the flow, and this is why the end of the arm is situated sufficiently far away to redynamise the speed of the fluid in rotation.

Naturally, various modifications can be made by a person skilled in the art to the invention that has just been described, solely by way of non-limitative examples.

The invention claimed is:

1. A shroud of a compressor for an aircraft turbine engine, the shroud is arranged between two bladed rotary wheels and radially in line with a deflector situated between said two rotary wheels of the compressor, the shroud comprising a sealing device comprising one or more sealing elements projecting radially outwards in the direction of said deflector, said sealing device comprising, at a downstream end of said sealing device in a direction of flow of the discharge air through said sealing device, an end sealing element,
   wherein said shroud also comprises, projecting downstream from said end sealing element, an air entraining and diverting structure designed to axially divert discharge air issuing from the end sealing element.

2. The shroud according to claim 1, wherein said air entraining and diverting structure takes the form, in longitudinal half-section, of an arm carried by the end sealing element.

3. The shroud according to claim 2, wherein the arm is inclined axially so as to extend radially outwards going downstream, in the direction of flow of the discharge air.

4. The shroud according to claim 3, wherein the arm is inclined by an angle of between 20° and 60° with respect to the axial direction.

5. The shroud according to claim 1, wherein the air entraining and diverting structure is produced in a single piece with the end sealing element.

6. The shroud according to claim 1, wherein the end sealing element has, from a base of said end sealing element, a sealing-element height H1, and wherein the air entraining and diverting structure is connected to the end sealing element at a base of the air entraining and diverting structure, the centre of which is situated at a height H2 from the base of the end sealing element so that the heights H1 and H2 satisfy the following formula: H2>H1/3.

7. A compressor for an aircraft turbine engine, comprising two bladed rotary wheels between which a deflector is placed, the compressor also comprising a shroud connecting the bladed rotary wheels and situated radially in line with the deflector,
   wherein said shroud comprises a sealing device comprising one or more sealing elements projecting radially outwards in the direction of said deflector, said sealing device comprising, at a downstream end of said sealing device in a direction of flow of the discharge air through said sealing device, an end sealing element,
   wherein said shroud also comprises, projecting downstream from said end sealing element, an air entraining and diverting structure designed to axially divert discharge air issuing from the end sealing element, and
   wherein the deflector comprising an abradable cladding cooperating with each of the one or more sealing elements of the sealing device of the shroud.

8. The compressor according to claim 7, wherein the air entraining and diverting structure has no contact with the abradable cladding.

9. The compressor according to claim 7, wherein the clearance between the abradable cladding and the end sealing element is less than the minimum distance between the air entraining and diverting structure and the abradable cladding.

10. An aircraft turbine engine comprising a compressor according to claim 7, said compressor being a high-pressure compressor.

* * * * *

UNITED STATES PATENT AND TRADEMARK OFFICE
CERTIFICATE OF CORRECTION

PATENT NO.        : 10,273,967 B2
APPLICATION NO.   : 15/104894
DATED             : April 30, 2019
INVENTOR(S)       : Christophe Scholtes et al.

Page 1 of 1

It is certified that error appears in the above-identified patent and that said Letters Patent is hereby corrected as shown below:

On the Title Page

Item (71), under Applicant: delete "SANFRAN AIRCRAFT ENGINES" and insert --SAFRAN AIRCRAFT ENGINES--.

Signed and Sealed this
Fifteenth Day of October, 2019

Andrei Iancu
*Director of the United States Patent and Trademark Office*